April 13, 1937.  G. SPINDLER  2,076,924
PROJECTOR
Filed March 10, 1936  2 Sheets-Sheet 1
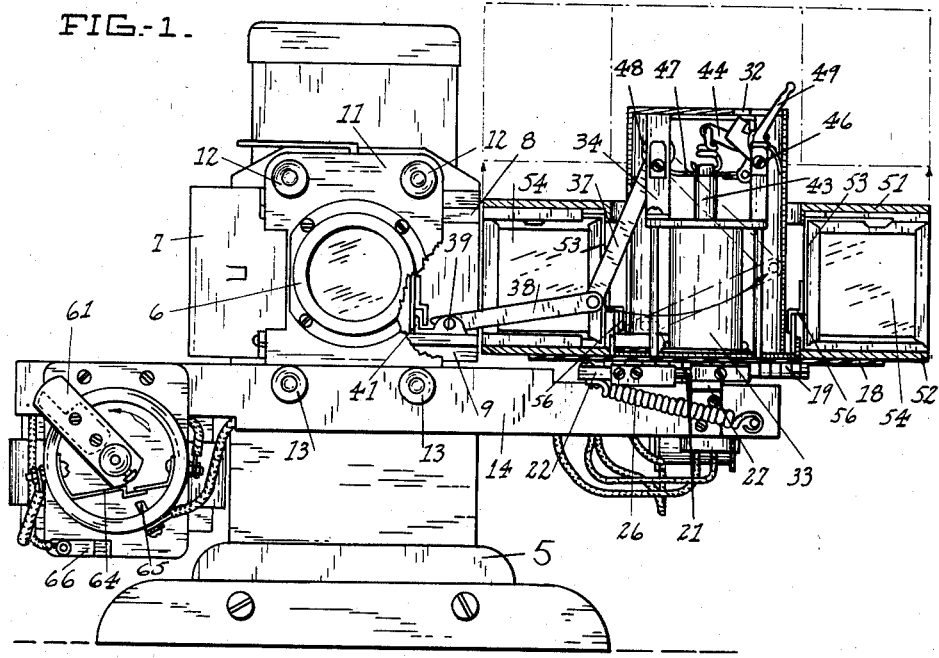
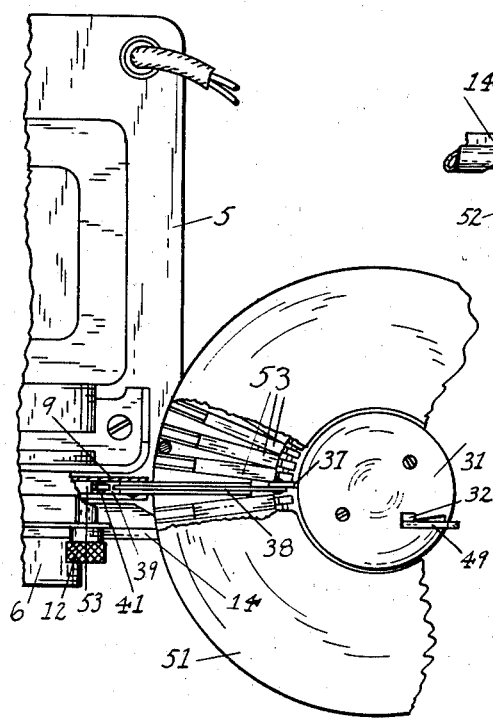
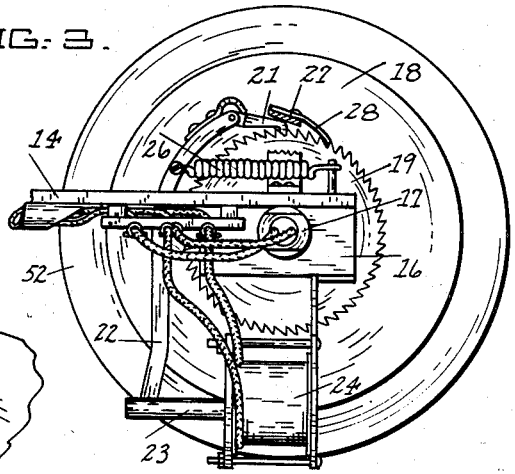
INVENTOR.
GUSTAV SPINDLER.
BY
ATTORNEY.

April 13, 1937.　　　　G. SPINDLER　　　　2,076,924
PROJECTOR
Filed March 10, 1936　　　2 Sheets-Sheet 2

INVENTOR.
GUSTAV SPINDLER
BY
ATTORNEY

UNITED STATES PATENT OFFICE 2,076,924

PROJECTOR

Gustav Spindler, San Francisco, Calif., assignor to Spindler & Sauppe, a corporation of California Application March 10, 1936, Serial No. 68,080

4 Claims. (Cl. 88—27)

This invention relates to improvements in projectors and has particular reference to means for automatically projecting a series of slides one after the other.

A further object is to produce a device of this character which may be readily attached to an ordinary stereopticon lantern without materially altering its construction.

A further object is to produce a device of this character wherein magazines of slides may be quickly changed when desired.

A further object is to produce a device of this character which is economical to manufacture.

Other objects and advantages will be apparent during the course of the following description.

In the accompanying drawings forming a part of this specification and in which like numerals are employed to designate like parts throughout the same, Fig. 1 is a front elevation of a projector having my invention applied thereto, certain portions being shown in cross section to better illustrate the mechanism thereof;

Fig. 2 is a fragmentary top plan view showing a portion of the magazine broken away;

Fig. 3 is a bottom plan view of the magazine, supporting plate, and its ratchet mechanism;

Figure 6:
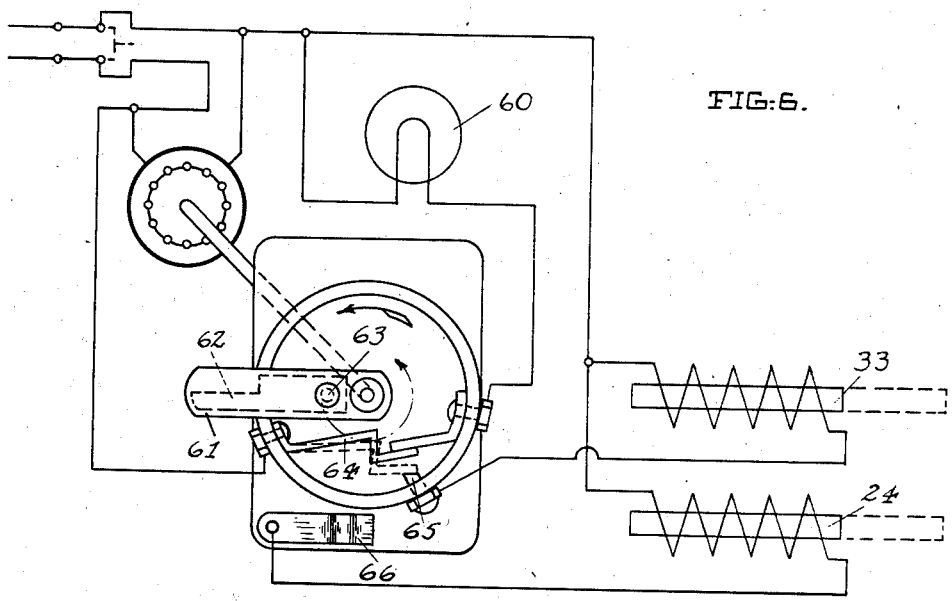
Fig. 6 is a diagrammatic illustration of the wiring circuit.

In the showing of stereopticon slides it has been customary to employ a projector and to manually feed into the light beam of the projector, a transparent slide having a picture or other information thereon. This manual operation requires an operator constantly in attendance. Moreover, the moving of the slide, in most instances, is witnessed by the viewer and is objectionable.

I have, therefore, devised a projector mechanism wherein a magazine contains a plurality of slides radially arranged and adapted to be slid successively into and out of the beam of light of the projector and to, at the same time, extinguish the light during the period of movement of the slide.

In the accompanying drawings wherein for the purpose of illustration is shown a preferred embodiment of my invention, the numeral 5 designates an ordinary projector which forms no part of my invention. Secured to the front of the projector is a lens 6, to the rear of which is positioned a slide 7 having guides 8 and 9. The lens board 11 is secured to the projector by thumb nuts 12 and 13; and I propose to employ two of these thumb nuts to secure a supporting bar 14 to the front of the projector. This supporting bar carries a block 16 through which a bearing stud 17 projects. Rotatably supported upon this stud is a plate 18; and this plate has a ratchet 19 secured thereto. This ratchet is engaged by a spring-pressed dog 21 carried on the end of a pivoted lever 22, which lever is actuated by the armature 23 of a solenoid 24. A spring 26 normally keeps the dog 21 in the position of Fig. 3, that is, with its nose within the tooth of the ratchet and also abutting the stop 27. A spring 28 prevents retrograde movement of the ratchet 19. Supported upon the bearing 17 and above the plate 18 is a plate 29, which supports the slide changing mechanism which is enclosed by a cover 31 having an L-shaped slot 32 in the top thereof, the purpose of which will be later seen.

Figure 4:
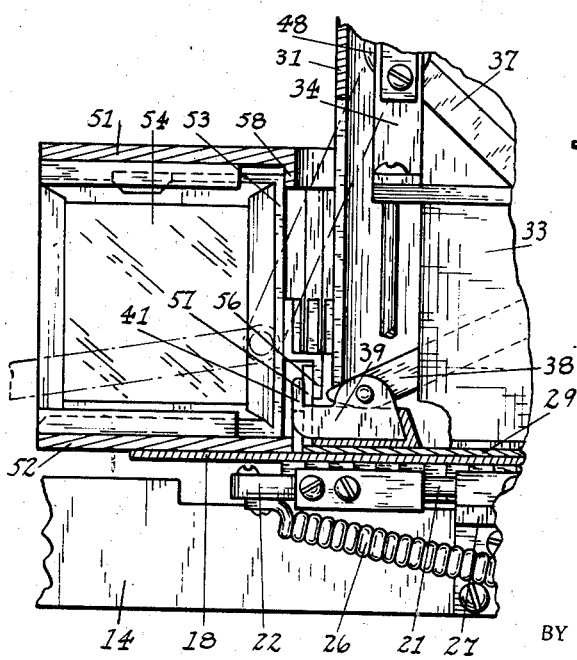
Fig. 4 is an enlarged fragmentary detailed view showing the slide carrier and its relation to the slide.
Figure 5:
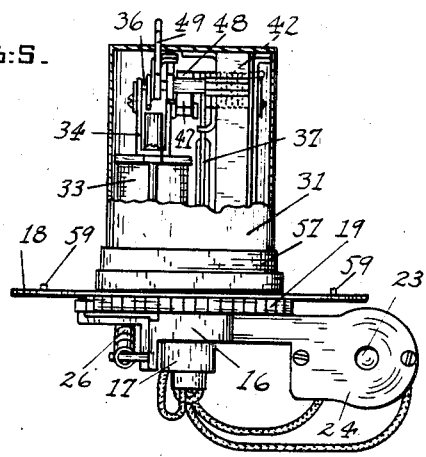
Fig. 5 is a rear elevation of the magazine plate and slide carrier mechanism, a portion of the housing being broken away.

The slide changing mechanism comprises a solenoid 33 positioned upon the plate 29 and supporting a bracket 34 in which is journaled one end of a shaft 36. This shaft has an arm 37 which is pivoted to a link 38, which is in turn pivoted to a shoe 39 having an upstanding finger 41. In order to rotate this shaft 36, I employ a spring 42, as shown in dotted lines in Fig. 5, which spring normally tends to hold the parts in the full line position of Fig. 1. In order to rotate this shaft 36 against the tension of the spring 42, I provide an armature 43 which is connected to a bell crank lever 44, pivoted as at 46 and having its opposite end connected by a strap 47 to a drum 48 formed upon the shaft 36. In order to manually retract the lever 37 and its attached parts, I employ a finger piece 49, which, when in the position of Fig. 1, permits a free movement of the armature 43 and the parts attached thereto; but when this finger piece is moved toward the left of the figure and moved into the offset of the slot 32, the bell crank lever 44 will be depressed, forcing the armature 43 downward and retracting the lever 37, link 38, and shoe 39 to the full line position of Fig. 4.

The magazines in which the slides are supported consist of a top plate 51 and a bottom plate 52, which are provided with radial slots in which slide holders 53 are slidably supported, and in each one of these slide holders is placed a transparent slide 54. Each slide holder has an offset hook 56 which overlaps a ring 57 mounted upon the plate 29. This ring 57 is continuous with the exception of a single break through which the shoe 39 may pass. The upper plate 51 carries a stop 58 adapted to be contacted by the back of the slide holder 53. Pins 59, carried in the plate 18, enter holes formed in the bottom of the plate 52, thus holding the magazine in fixed position on the plate 18.

In order to operate the solenoids in proper sequence, I provide a timer which may be of any desired construction, but here shown for matter of illustration, as a motor-driven arm 61 which carries a contact 62 upon its under-surface to which is electrically connected a pin 63. This pin in its path of rotation first engages the spring contact 64, depressing it and breaking the circuit to the projector lamp 60. Further rotation moves the contact 64 into engagement with the contact 65, establishing a circuit through the solenoid 33, and at the same time, the contact 62 will engage the contact 66 and energize the solenoid 24.

The result of this construction is that when my device is attached to a projector and a magazine placed upon the plate 18, in the manner indicated in dotted lines in Fig. 1, the act of placing the magazine on the plate will cause the hooks 56 on all of the slide holders to engage the ring 57, thus holding all of the slides against accidental misplacement.

We will assume that the finger piece 49 is now released from its offset in the slot 32. The result will be that the spring 42 will rotate the shaft 36 and move the lever 37, link 38, and shoe 39 from the dotted line position of Fig. 1 to the full line position, which act will cause one of the slides to be moved into the projector between the guides 8 and 9.

We will now assume that the timer mechanism is moving and that the light is lit; and as soon as the arm 61 rotates a sufficient distance from that of Fig. 6 to cause the pin 63 to engage the movable contact 64, this movement will break the circuit to one side of the lamp filament, as is obvious. Further movement of the arm 61 will cause the contact 64 to engage the contact 65 and operate the solenoid 33. At the same time, the contact 62 will engage the contact 66 and conduct current to the solenoid 24. In other words, both solenoids are energized simultaneously. The solenoid 24 acts to stretch the spring 26, moving the dog 21 into a new ratchet tooth, and the solenoid 33 withdrawing the slide from the projector; and due to the shape of the contact 62, the circuit to the contact 66 and thus to the solenoid 24 will be released first, thus letting the spring 26 function to rotate the magazine until the back of the dog hits the stop 22. The circuit to the solenoid 33 will shortly thereafter be broken, and the spring 42 will move a new slide into the projector, and directly thereafter the pin 63 will move off of the hump on the contact 64, and a circuit will be re-established to the projector light.

Thus it will be apparent that while the machine is running, a slide will be moved into the projector, the light turned on, then off, the slide removed and a new slide placed in the projector, all operations taking place in the proper sequence. It will also be apparent that my device may be manually operated from a remote point through a hand operated switch without altering my invention.

It is to be understood that the form of my invention herewith shown and described is to be taken as a preferred example of the same and that various changes relative to the material, size, shape and arrangement of parts may be resorted to without departing from the spirit of the invention or the scope of the subjoined claims.

Having thus described my invention, I claim:—

1. A slide actuating mechanism of the character described, including a rotatable supporting plate, means for intermittently rotating said plate a step at a time, a magazine positioned on said plate and having radially arranged grooves therein, slide holders mounted in said grooves, said slide holders having a hook formed thereon, a ring supported above said plate and held stationary relative to the movement thereof, said ring being engaged by said hooks, said ring having an opening therethrough whereby one of said hook carriers may be withdrawn from said magazine and moved to a point beyond the periphery of said magazine.

2. A slide actuating mechanism of the character described, including a rotatable supporting plate, means for intermittently rotating said plate a step at a time, a magazine positioned on said plate and having radially arranged grooves therein, slide holders mounted in said grooves, said slide holders having a hook formed thereon, a ring supported above said plate and held stationary relative to the movement thereof, said ring being engaged by said hooks, said ring having an opening therethrough whereby one of said hook carriers may be withdrawn from said magazine and moved to a point beyond the periphery of said magazine, and means for engaging said slide holders to effect withdrawal and replacement of said slides with relation to said magazine.

3. A slide actuating mechanism for use with a projector, including a support secured to the projector, a plate rotatably mounted on said support, ratchet means for intermittently rotating said plate in a step by step manner, an upstanding ring mounted on said plate and having an opening therein, a magazine removably mounted on said plate, said magazine having radially arranged slots, a slide holder positioned in each of said slots, each of said slide holders having a downwardly extending hook formed thereon, the free end of said hook engaging said ring when said magazine is positioned on said plate, and means for moving said slide holder radially from said magazine when said hook on said slide holder is adjacent the opening in said ring.

4. A slide actuating mechanism for use with a projector, including a support secured to the projector, a plate rotatably mounted on said support, ratchet means for intermittently rotating said plate in a step by step manner, an upstanding ring mounted on said plate and having an opening therein, a magazine removably mounted on said plate, said magazine having radially arranged slots, a slide holder positioned in each of said slots, each of said slide holders having a downwardly extending hook formed thereon, the free end of said hook engaging said ring when said magazine is positioned on said plate, means for moving said slide holder radially from said magazine when said hook on said slide holder is adjacent the opening in said ring, said means including a pivoted arm, a shoe pivotally attached to said arm and slidable through the slot in said ring, said shoe having a finger engaging the hook on the slide to be moved, and means for actuating said pivoted arm to withdraw said slide into said magazine.

GUSTAV SPINDLER.